US009780707B2

United States Patent
Hidaka et al.

(10) Patent No.: US 9,780,707 B2
(45) Date of Patent: Oct. 3, 2017

(54) DRIVE CONTROLLER AND MOTOR DRIVE SYSTEM

(71) Applicant: DENSO CORPORATION, Kariya, Aichi-pref. (JP)

(72) Inventors: Yuuji Hidaka, Kariya (JP); Kiyoshi Nagata, Kariya (JP); Masaya Ootake, Kariya (JP); Hirokazu Toyoda, Kariya (JP); Manabu Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 223 days.

(21) Appl. No.: 14/918,770

(22) Filed: Oct. 21, 2015

(65) Prior Publication Data

US 2016/0118918 A1 Apr. 28, 2016

(30) Foreign Application Priority Data

Oct. 23, 2014 (JP) .................................. 2014-216142

(51) Int. Cl.
*H02H 7/09* (2006.01)
*H02P 1/04* (2006.01)
*H02P 6/20* (2016.01)
*H02P 6/18* (2016.01)

(52) U.S. Cl.
CPC ................. *H02P 6/20* (2013.01); *H02P 1/04* (2013.01); *H02P 6/18* (2013.01)

(58) Field of Classification Search
CPC ................. H02P 6/20; H02P 6/18; H02P 1/04
USPC .............................................. 318/400.22, 430
See application file for complete search history.

(56) References Cited

U.S. PATENT DOCUMENTS

| 9,333,966 | B2* | 5/2016 | Matsudaira | |
|---|---|---|---|---|
| 2006/0138880 | A1* | 6/2006 | Kimura | F02N 19/005 310/68 B |
| 2012/0198953 | A1* | 8/2012 | Midorikawa | B60R 22/46 74/335 |
| 2012/0234566 | A1* | 9/2012 | Mashiko | B25B 21/02 173/93.5 |
| 2014/0139171 | A1* | 5/2014 | Yoshida | F16H 61/32 318/603 |
| 2014/0330465 | A1* | 11/2014 | Matsudaira | B60W 20/00 701/22 |

(Continued)

FOREIGN PATENT DOCUMENTS

| JP | 2006-027315 | 2/2006 |
|---|---|---|
| JP | 2011-036083 | 2/2011 |

(Continued)

*Primary Examiner* — Bentsu Ro
*Assistant Examiner* — Gabriel Agared
(74) *Attorney, Agent, or Firm* — Nixon & Vanderhye PC

(57) ABSTRACT

A drive controller that controls a drive of a motor. The drive controller performs a collision force moderation control during a motor start time, during which a collision force in a collision between a shaft outwall with an impeller hole inwall for a positioning is moderated, by changing a power supply at a stage transition time of transiting from a position detection to a position determination. The maximum value of a first output value during a position detection time is set to be greater than a first threshold that at least causes a rotation number of the motor to yield a detectable induction voltage. A second output value during a position determination time is set to be lower than a second threshold that causes a wear or a breakage of an impeller by the collision force.

14 Claims, 8 Drawing Sheets

(56) References Cited

U.S. PATENT DOCUMENTS

2015/0217764 A1\* 8/2015 Hoshiba ................. B60K 6/24
701/22

FOREIGN PATENT DOCUMENTS

| JP | 2011-148379 | 8/2011 |
|---|---|---|
| WO | WO 2015/072124 | 5/2015 |

\* cited by examiner

DRIVE CONTROLLER AND MOTOR DRIVE SYSTEM

CROSS REFERENCE TO RELATED APPLICATION

The present application is based on and claims the benefit of priority of Japanese Patent Application No. 2014-216142, filed on Oct. 23, 2014, the disclosure of which is incorporated herein by reference.

TECHNICAL FIELD

The present disclosure generally relates to a drive controller and a motor drive system using such a drive controller.

BACKGROUND INFORMATION

Generally, a drive controller is used for a drive control of a motor by the control of an electric current flowing in a motor, which is realized either by controlling an electric voltage applied to the motor, or by controlling an electric power supplied to the motor.

For example, a motor drive device disclosed in a patent document, Japanese Patent Laid-Open No. 2011-148379 (patent document 1) sets an electric current restriction level of a forced commutation to a higher-than-normal level, which is higher than a restriction level used in a motor rotation in a normal state at a constant number of motor rotations, when a position sensor-less type brushless motor is started, for a reduction of a start-up time.

Generally, a motor torque output from the motor is transmitted to a drive load via an engagement between a rotatable engager of a rotor and a force receiver of the load in a "rotatably-gapped state."

More specifically, the rotatable engager is provided as a rod which engages with an inside of a hole of the force receiver for driving the load, or the rotatable engager is provided as a cylinder which engages with an outside of a rod of the force receiver for driving the load. In either case, at a drive start time or at a rotation reversed time, the rotatable engager engages with the force receiver after a small amount of rotation to collide with a wall of the force receiver, and after such a collision, the two parts start to rotate together.

When an operation immediately before such a collision of the rotatable engager with the force receiver is designated as a "collision preparation stage," and an operation of the rotatable engager before the collision preparation state is designated as a "pre-operation state," the transition from the pre-operation stage to the collision preparation stage is caused by a power supply switching.

For example, at the start time of the brushless motor of a position sensor-less type, the position of the rotor is "detected" by performing a preset power supply, and a drive start position is "determined" based on a detected position of the rotor, and the rotor is subsequently rotated to the drive start position by switching the power supply for the "positioning" of the rotor. In a three-phase brushless motor, two out of three-phases receive a power supply for a rotation of the rotor and a position of the rotor is detected based on an induction voltage in a non-power-supply phase, which is an operation in the "pre-operation stage," and the rotation of the rotor to the drive start position for the positioning is performed in the "collision preparation stage."

The collision of the rotatable engager with the force receiver, which may momentarily exceed a breakage threshold of the material of the two parts, or may be repeated to lead to a material fatigue, causes an abrasion or a breakage of weaker one of the rotatable engager and the force receiver, in combination of a complex external factors of high temperature, high pressure, strong vibration and the like.

For example, when the rod as the rotatable engager is made with metal and the force receiver is made with resin, the inner wall of the force receiver may be repeatedly collided with the rod at every start time, and may be fatigued, cracked, or broken.

In the device the of patent document 1, although the electric current restriction level is managed from a view point of reduction of a start-up time reduction of the brushless motor, no consideration is made for wear or breakage of the material caused by a collision between the rotatable engager and the force receiver or the like.

SUMMARY

The present disclosure provides a motor controller and a motor drive system using such a controller, which enables a prevention of wear and breakage of the parts due to the collision of the rotatable engager with the force receiver.

The motor controller of the present disclosure controls a drive of a motor that outputs a torque to a load. The drive controller includes a microcomputer configured to include a power supply control section that controls a power supply including at least one of an electric current, an electric voltage, or an electric power to the motor. The motor has a stator and a rotor that is rotatably disposed relative to the stator, and has a rotatable engager that is engaged with a force receiver of the drive load. The engagement of the rotatable engager and the force receiver is established with a gap interposed between the rotatable engager and the force receiver, allowing for a rotation of the rotatable engager relative to the force receiver. When a collision of the rotatable engager with the force receiver is predicted during a motor start time or during a motor drive time, the power supply control section performs a collision force moderation control in a pre-operation stage and in a collision preparation stage. Also, the pre-operation stage of the collision force moderation control controls a pre-operation of the rotatable engager prior to the collision. Further the collision preparation stage of the collision force moderation control controls an operation of the rotatable engager from a switching of the power supply by the power supply control section subsequent to the pre-operation stage until the collision. Also, the collision force moderation control changes a first output value of the power supply in the pre-operation stage to a second output value of the power supply in the collision preparation stage, for a moderation of a collision force generated in the predicted collision of the rotatable engager with the force receiver.

That is, in the present disclosure, when the power supply is switched according to a transition from the pre-operation stage to the collision preparation stage prior to a collision, the switching of the power supply is performed (i) for a startability of the motor (i.e., for starting the motor in a short period of time) in the pre-operation stage, for example, and (ii) for moderating the collision force in the collision preparation stage.

Therefore, while preventing a wear and breakage of the motor component by the collision between the rotatable engager and the force receiver, the drive characteristics of the motor is preferably maintained.

The motor drive system of the present disclosure includes a motor having a stator and a rotor that is rotatably disposed relative to the stator. The rotor has a rotatable engager engaged with a force receiver of a load. The engagement of the rotatable engager and the force receiver established by a rotatable gap interposed between the rotatable engager and the force receiver to transmit a torque output from the motor. The motor drive system also has a load that includes the force receiver, and a drive controller that controls a drive of a motor that outputs a torque to a load. The drive controller is configured to include a power supply control section that controls a power supply that includes at least one of an electric current, an electric voltage, or an electric power to the motor having a stator and a rotor that is rotatably disposed relative to the stator. The rotor has a rotatable engager being engaged with a force receiver of the drive load. The engagement of the rotatable engager and the force receiver is established with a gap interposed between the rotatable engager and the force receiver to allow rotation of the rotatable engager relative to the force receiver. When a collision of the rotatable engager with the force receiver is predicted during a motor start time or during a motor drive time, the power supply control section performs a collision force moderation control in a pre-operation stage and in a collision preparation stage. Also, the pre-operation stage of the collision force moderation control controls a pre-operation of the rotatable engager prior to the collision. Further, the collision preparation stage of the collision force moderation control controls an operation of the rotatable engager from a switching of the power supply by the power supply control section subsequent to the pre-operation stage until the collision. Also, the collision force moderation control changes a first output value of the power supply in the pre-operation stage to a second output value of the power supply in the collision preparation stage, for a moderation of a collision force generated in the predicted collision of the rotatable engager with the force receiver.

The motor drive system of the present disclosure prevents a wear and breakage of the relevant components by a collision of the rotatable engager with the force receiver by performing the collision force moderation control of the motor controller when the collision of the rotatable engager with the force receiver is predicted during the motor start time or during the motor drive time.

Further, as an application of the present disclosure, a motor drive system in a vehicle for operating a fuel pump, a fan, etc., as a drive load by using the motor controller described above, may be a suitable target subject, since the motor in the vehicle is very frequently started and controlled as well as being expected to have a long life.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
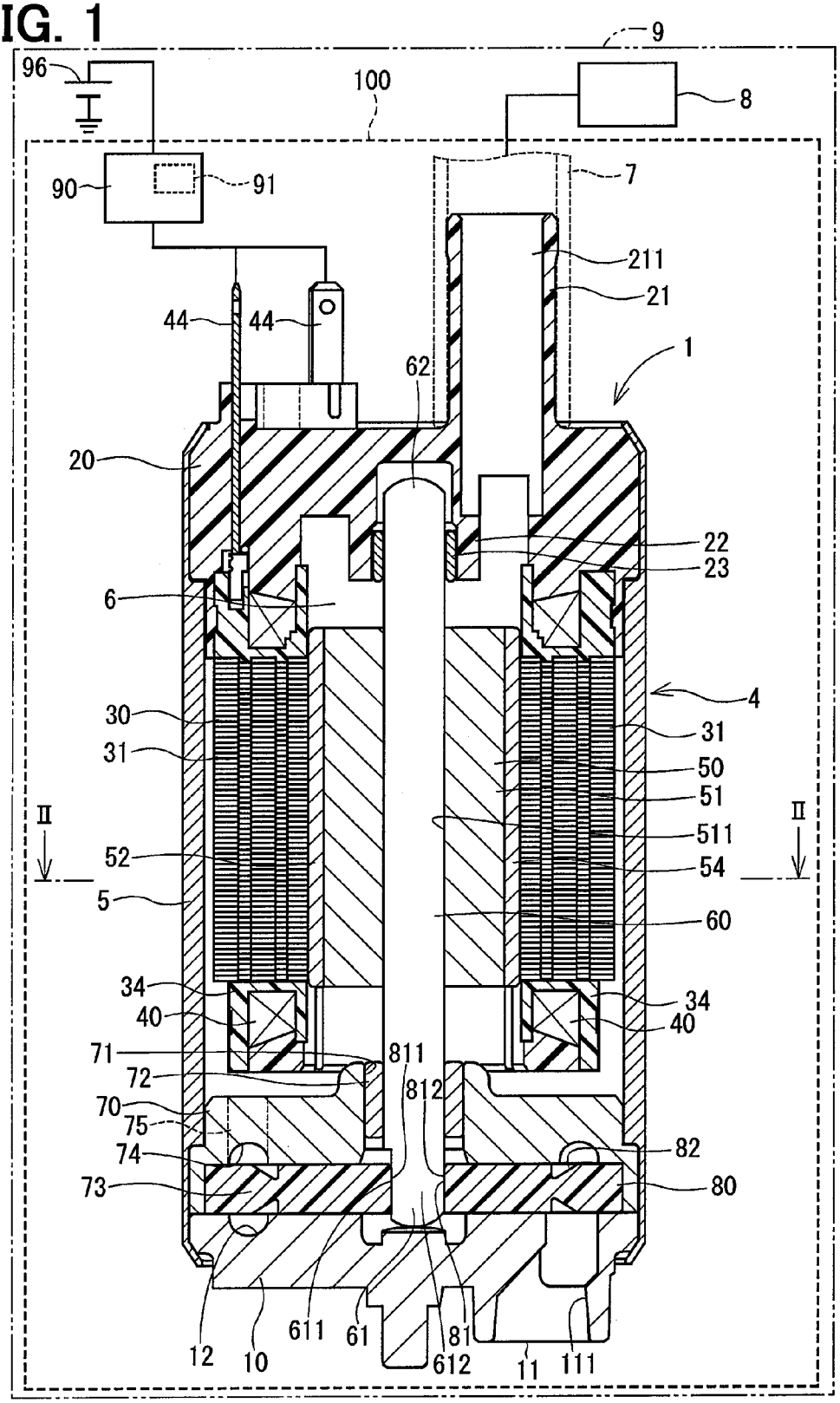
FIG. 1 is a sectional view of a drive controller and a fuel pump in an embodiment of the present disclosure.

Hereafter, the drive controller and the motor drive system which carries out drive control of the motor using the drive controller are described in various embodiments of the present disclosure based on the drawing. For the readability of the drawing, the numerals may be assigned to only one or two of the same components in one drawing, or only one or two parts of the several equivalent parts.

(Common Structure)

The configuration and/or the structure that are common to each of the various embodiments of the present disclosure are described with reference to FIGS. 1-6C.

A motor drive system 100 shown in FIG. 1 is installed in a vehicle 9, and includes a fuel pump 1 in which a brushless motor 4 (i.e., henceforth designated as "the motor 4") and an impeller 80 as a "load" are combined in one body, and a drive controller 90.

The fuel pump 1 is driven with the electric power supplied, for example from a battery 96 of the vehicle 9. The fuel pump 1 sucks a fuel in a fuel tank (not illustrated) and discharges to supply the fuel to an internal-combustion engine 8 that is a fuel supply object, providing an example of a "liquid pump for press-feeding a liquid". In the case that the vehicle 9 is an idling stop vehicle or a hybrid vehicle, the fuel pump 1 may be very frequently started and stopped (i.e., may have a high on-off numbers) in a preset period of expected use period. In other words, the fuel pump 1 may be very frequently started after it is stopped.

The fuel pump 1 is provided with the motor 4, a housing 5, a pump cover 10, a cover end 20, and the impeller 80 as a "load" together with other parts.

The motor 4 is provided with a stator 30 serving as a stator, a winding 40, a rotor 50 serving as a "rotor", and a shaft 60 serving as a "rotatable engager" together with other parts.

Figure 2:
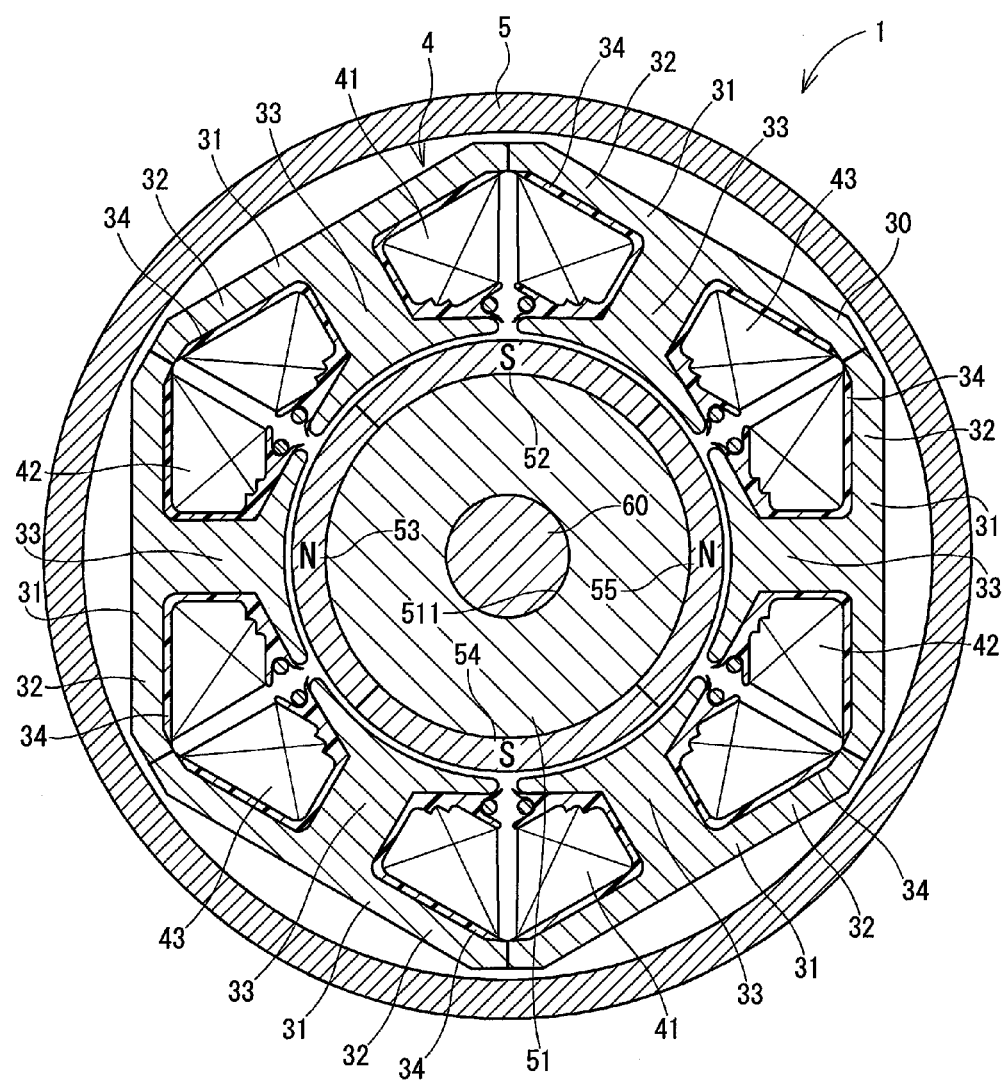
FIG. 2 is a cross sectional view of FIG. 1 along a II-II line in FIG. 1.

As shown in FIG. 2, the stator 30 has a segment 31 and an insulator 34 and the like.

The segment 31 is formed from a laminated iron core which is layered thin boards of the magnetic material. According to the present embodiment, six segments 31 are provided. The segment 31 has a yoke part 32 and a teeth part 33. The stator 30 is formed in a cylinder shape, as an arrangement of six yoke parts 32 forming a hexagonal pipe shape. The teeth part 33 extends from the center of the yoke part 32 toward a radially-inward direction. The insulator 34 is formed with resin and is disposed on the teeth part 33 of the segment 31.

The winding 40 is formed, for example, with metal (e.g. copper), and consists of a U phase winding 41, a V phase winding 42, and a W phase winding 43, and is disposed on the teeth part 33 of the stator 30 (i.e., being wound on the insulator 34). The U phase winding 41 serves as a U phase of the motor 4, the V phase winding 42 serves as a V phase of the motor 4, and the W phase winding 43 serves as a W phase of the motor 4.

The rotor 50 is formed in a cylinder shape, and has a core 51 and magnets 52, 53, 54, 55. The rotor 50 is rotatable in an inside of the stator 30.

The core 51 is formed approximately in cylinder shape, and has a hole 511 at the center. The magnets 52, 53, 54, and 55 are arranged in order along a periphery at an outwall of the core 51. The magnets 52 and 54 are magnetized so that the corresponding outside positions of the rotor 50 serve as the S pole. The magnets 53 and 55 are magnetized so that the corresponding outside positions of the rotor 50 serve as the N pole. That is, the outwall of the rotor 50 has the N poles and the S poles alternatively arranged in order.

Thus, in the present embodiment, the motor 4 is a three-phase brushless motor of 4 poles (i.e., two pole pairs) and 6 slots. In the present embodiment, no position sensing device, which is capable of detecting the rotation position of the rotor 50, is provided in the brushless motor 4. That is, the motor 4 is a brushless motor of a position sensor-less type.

In the present embodiment, since the number of ON-OFF times of the fuel pump 1 is great in a preset period, the number of ON-OFF times of the brushless motor 4 is great.

The shaft 60 is formed in a rod shape (i.e., in a long column shape) with metal (e.g. with stainless steel). The shaft 60 fits in (i.e., engages with) the hole 511 of the core 51 of the rotor 50, and is connected with the rotor 50. Thereby, the shaft 60 is rotatable together with the rotor 50.

Figure 3:
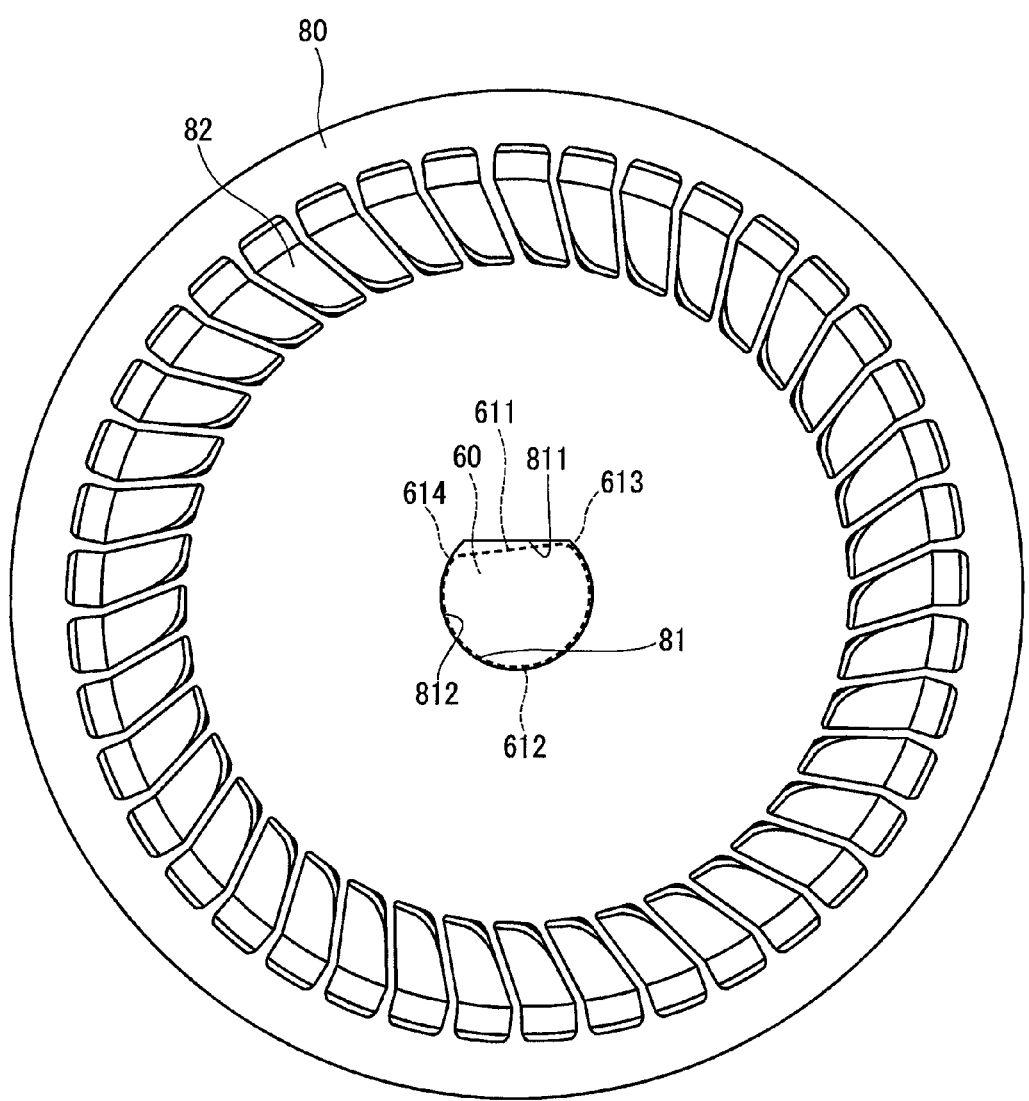
FIG. 3 is an illustration of an impeller of the fuel pump in the embodiment of the present disclosure.

According to the present embodiment, one end 61 of the shaft 60 has a D shape cross section along a plane that is perpendicular to the shaft 60 (refer to FIG. 3). The D shape means at least a portion of a round and circumferential wall of the shaft 60 is formed as a planar surface. A plane outwall 611 of the shaft 60 and a curved outwall 612 correspond to a "driving outwall." Further, corners 613 and 614 including the boundary between the plane outwall 611 and the curved outwall 612 are tapered to have a smooth surface.

The housing 5 is formed substantially in a cylinder shape, for example with metal (e.g., iron). A surface of the housing has a plating treatment by zinc or tin, for example.

The pump cover 10 is formed in a round disk shape, for example, with metal (e.g. aluminum), and closes an end of the housing 5. The pump cover 10 is fixed in an inside of the housing 5 by caulking the end part of the housing 5 toward a radial inside, which prevents a drop of the pump cover 10 along an axial direction of the fuel pump 1. As shown in FIG. 1, the pump cover 10 has a suction part 11 in a pipe shape. The suction part 11 provides a suction passage 111 which pierces through the pump cover 10 along a board thickness direction.

The cover end 20 is formed in a disk shape, for example with resin, and closes the other end of the housing 5. The cover end 20 has an outer edge section press-fitted in an inside of the other end of the housing 5. The cover end 20 is fixed in the inside of the housing 5 by caulking the other end of the housing 5 toward a radial inside, which prevents a drop of the cover end 20 along an axial direction of the pump 1.

As shown in FIG. 1, the segment 31, the insulator 34, and the winding 40 that constitute the stator 30 are molded with the resin that forms the cover end 20. That is, the stator 30 and the cover end 20 are molded to have one body with the resin molding. Thus, the stator 30 is co-axially accommodated in an inside of the housing 5.

At a position between the pump cover 10 and the stator 30, a pump case 70 substantially in a cylinder shape is provided, which is made, for example, with metal (e.g., aluminum). A hole 71 which pierces through the pump case 70 along a board thickness direction is bored at the central part of the pump case 70. The hole 71 of the pump case 70 has a bearing member 72 inserted into the hole 71. The bearing member 72 has a cylinder shape, for example, with a sintered metal of copper or the like.

A bearing 22 is formed at the center of the cover end 20 on a rotor 50 side. The bearing 22 is formed at the center of the cover end 20 in a protruding manner from the cover end 20. The center axis of the bearing 22 is co-axially arranged with the axis of the cover end 20. That is, the bearing 22 is formed on the center axis of the cover end 20. In an inside the bearing 22, a bearing part 23 is fixedly inserted. The bearing part 23 is formed in a cylinder shape with the sintered metal of copper or the like, just like the bearing member 72.

The hole 71 of the pump case 70 bears the one end 61 of the shaft 60 via the bearing member 72. The bearing 22 of the cover end 20 bears an other end 62 of the shaft 60 via the bearing part 23. Thereby, the rotor 50 and the shaft 60 are rotatably supported by the pump case 70 and the cover end 20 via the bearing member 72, the hole 71, the bearing part 23, and the bearing 22.

The impeller 80, which is formed in an approximately round disk shape with resin (e.g., Polyphenyle Sulfide (PPS)), and is accommodated in a round disk shape pump room 73 that is formed at a position between the pump cover 10 and the pump case 70. A hole 81 piercing the impeller 80 along a board thickness direction is bored at the center of the impeller 80. The hole 81 is formed in the D shape, which resembles a shape of character D, which corresponds to the sectional shape of the one end 61 of the shaft 60. A plane inwall 811 of the hole 81 and a curved inwall 812 correspond to a "driven inwall."

The one end 61 of the shaft 60 serving as a "rotatable engager" engages with the hole 81 serving as a "force receiver" in a gap reserving state, in which, after a gap between the hole 81 and the one end 61 of the shaft 60 is exhausted as the shaft 60 rotates in one direction, the one end 61 collides with the hole 81. By reserving such a gap, the assembly error and the dimension error of the impeller 80 are absorbed. After the engagement of the one end 61 of the shaft 60 with the hole 81, the shaft 60 rotates together with the rotor 50, and the impeller 80 rotates in the pump room 73.

One face of the pump cover 10 facing the impeller 80 has a C shape groove 12 formed on the pump cover 10. The groove 12 is connected with the suction passage 111. Further, one face of the pump case 70 facing the impeller 80 has a C shape groove 74 formed on the pump case 70. The groove 74 has a passage 75 that pierces through the pump case 70 along a board thickness direction formed thereon. The impeller 80 has a blade part 82 at a position corresponding to the groove 12 and to the groove 74.

A discharge part 21 is provided on the cover end 20. The discharge part 21 made with resin is formed in one body with the cover end 20 to protrude from the cover end 20, protruding away from the cover end 20 (i.e., away from the pump cover 10). In an inside of the discharge part 21, a discharge passage 211 is provided. The discharge passage 211 communicates with a space 6 that is formed at a position between the pump cover 10 in the housing 5 and the cover end 20.

As shown in FIG. 1, the discharge part 21 is connected with a supply pipe 7, which has one end connected with the discharge part 21 and the other end connected with the internal-combustion engine 8. The fuel pressurized in the space 6 by the rotation of the impeller 80 passes the discharge passage 211, is discharged from the discharge part 21, and is supplied to the internal-combustion engine 8 via the supply pipe 7.

A terminal 44 is disposed on the cover end 20 (refer to FIG. 1). The terminal 44 is formed in a rod shape with metal (e.g., copper). According to the present embodiment, three terminals 44 are provided. One end of each of the three terminals 44 is respectively connected with the U phase winding 41, the V phase winding 42, and the W phase winding 43, and the other end of each of the three terminals is buried in the cover end 20, and is exposed from an opposite face of the cover end 20 (i.e., from a face that faces away from the pump cover 10).

The drive controller 90 is a Fuel Pump Controller (FPC) that performs a drive control of the motor 4, which is a part of the fuel pump 1. The drive controller 90 is connected with the terminal 44 and with the battery 96, coverts the electric power of the battery 96 into three-phase electric power, and supplies the electric power of the battery 96 to the motor 4.

Figure 4:
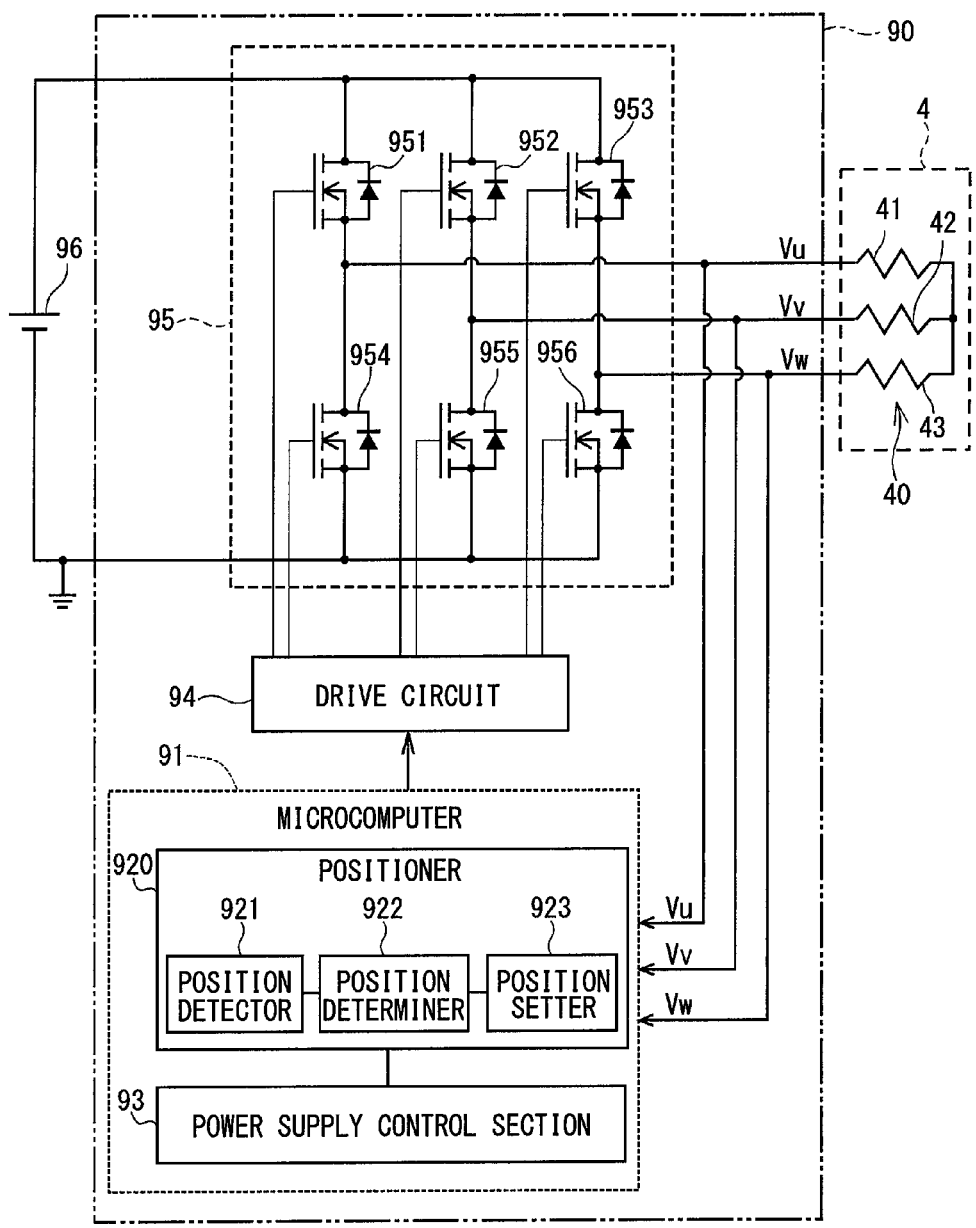
FIG. 4 is a schematic diagram of a circuit configuration of the drive controller in the embodiment of the present disclosure.

As shown in FIG. 4, the drive controller 90 has a microcomputer 91, a drive circuit 94, and a three-phase inverter 95. Bridge connection of six switching elements 951-956 is organized so that the three-phase inverter 95 is enabled to switch the power supply to the winding 40 (i.e., to the U phase winding 41, the V phase winding 42, the W phase winding 43). According to the present embodiment, a Metal Oxide Semiconductor Field Effect Transistor (MOSFET) is used as the switching elements 951-956. Hereafter, the switching elements 951-956 are designated as Metal Oxide Semiconductors (MOS) 951-956.

Three high-side MOS 951-953 respectively have the drain connected with a positive terminal of the battery 96, and have the source connected to the drain of the three low-side MOS 954-956. Three low-side MOS 954-956 respectively have the source connected with a negative terminal of the battery 96 (i.e., with a ground).

As shown in FIG. 4, the junction point of MOS 951 and MOS 954, which are paired, is connected with the one end of the U phase winding 41. Further, the junction point of MOS 952 and MOS 955, which are also paired, is connected with the one end of the V phase winding 42. Furthermore, the junction point of MOS 953 and MOS 956, which are also paired, is connected with the one end of the W phase winding 43.

The microcomputer 91 is a small computer which has a Central Processing Unit (CPU), Read-Only Memory (ROM), Random-Access Memory (RAM), Input/Output (I/O), etc., performs a calculation according to a program stored in ROM and based on an input signal, generates a control signal, and outputs the signal to the drive circuit 94.

Specifically, the microcomputer 91 controls the number of rotations of the motor 4 and a torque of the motor 4, by controlling the electric power supplied from the three-phase inverter 95 to the winding 40.

The microcomputer 91 of the present embodiment obtains the voltage applied to the U phase winding 41, the V phase winding 42, and the W phase winding 43. Thereby, for example, the induction voltage induced in a non-power-supplied phase is detectable when two other phases are receiving the electric power.

The microcomputer 91 further includes a positioner 920 that brings the rotor 50 to a drive start position for starting the drive control of the brushless motor 4, when starting the drive control thereof. The positioner 920 is used for a sensor-less control of the brushless motor 4. The microcomputer 91 also includes a power supply control section 93 that controls a "power supply" (i.e., at least one of an electric current, an electric voltage, or an electric power) supplied to the winding 40 of the motor 4. In more details, the positioner 920 includes a position detector 921, a position determiner 922, and a position setter 923.

Each of the three components above needs not be provided as a physically-separate form (e.g., the microcomputer 91 may serve as the positioner 920 and the power supply control section 93 as required on demand.) The detail of the operation regarding each of those components is mentioned later.

Regarding the "power supply," the winding 40 of the motor 4 in operation receives an "electric power" (i.e., an electric current multiplied by an electric voltage) indicating that the winding 40 will not receive the electric current only, or will not receive the electric voltage only.

However, in the present disclosure, the control of the power supply is achieved by at least one of (i) the control of the electric power, (ii) the control of the electric voltage, or (iii) the direct control of the electric power, and is described accordingly. Further, the power supply to the winding 40 of the motor 4 may simply be described as the power supply to the motor 4.

The drive circuit 94 generates an ON-OFF switching signal which switches an ON-OFF of MOS 951-956 in the three-phase inverter 95 based on the control signal inputted from the microcomputer 91, and outputs the generated signal to the gate of MOS 951-956. Thereby, MOS 951-956 performs a switching operation, and the electric power is supplied to the winding 40 (i.e., to the U phase winding 41, the V phase winding 42, the W phase winding 43) from the battery 96.

When the microcomputer 91 switches the power supply to the U phase winding 41, the V phase winding 42, and the W phase winding 43 via the drive circuit 94 and MOS 951-956, a rotating magnetic field is generated in the stator 30, and the rotor 50 rotates accordingly. When the rotor 50 rotates together with the shaft 60, the impeller 80 engaged with the shaft 60 also rotates.

Now, "a start of drive control" of the brushless motor 4 is described. Hereafter, "a start of drive control" may simply mean a "start" of the operation of the motor 4.

Since the brushless motor 4 of the present embodiment is a position sensor-less type, the position of rotor 50 relative to the stator 30 is unknown when the drive control of the rotor 50 has not yet been started, in which the rotor 50 stays un-rotated (i.e., is stopped). Therefore, the rotor 50 has to be forcefully brought to the "drive start position" (i.e., has to be positioned at a drive control startable position), relative to the stator 30, before starting the drive control, which is a N pole position of the stator 30 when the power supply to the winding 40 is started. The positioning of the rotor 50 by the microcomputer 91 before the drive control is a "positioning control."

Figure 5A:
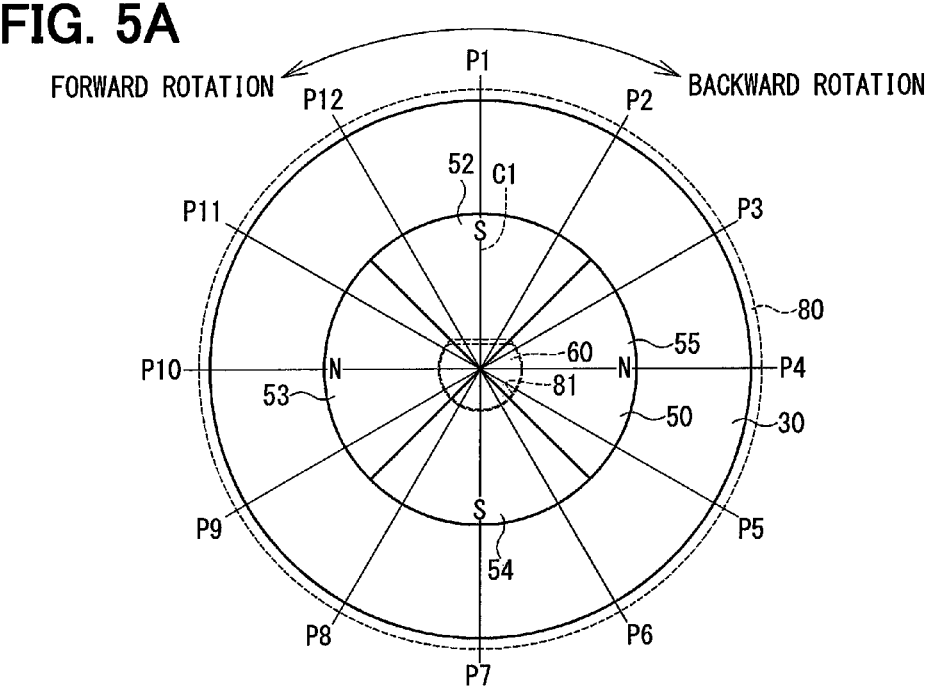
FIG. 5A is an illustration of a rotor positioning in which a rotor is positioned at a drive start position.

As shown in FIGS. 5A/B, a "drive start position" of the brushless motor 4 in the present embodiment, which has a "4 poles and 6 grooves" configuration, may be set to one of 12 positions (i.e., to an angle position of one of P1 to P12).

Therefore, when the center of one of the magnets 52-55 on the rotor 50 is positioned at one of the positions P1-P12, the drive control of the brushless motor 4 is startable (see to FIG. 5A).

The "forward rotation" shown in FIGS. 5A/B is a rotation of the rotor 50 and the shaft 60, which enables the impeller 80 to pressurize the fuel, and the "backward rotation" is a rotation of the rotor 50 and the shaft 60, which does not enable the impeller 80 to pressurize the fuel. The forward rotation and the backward rotation are set according to the arrangement of each of the phase windings 41, 42, 43, and to a view of the impeller 80.

Figure 6A:
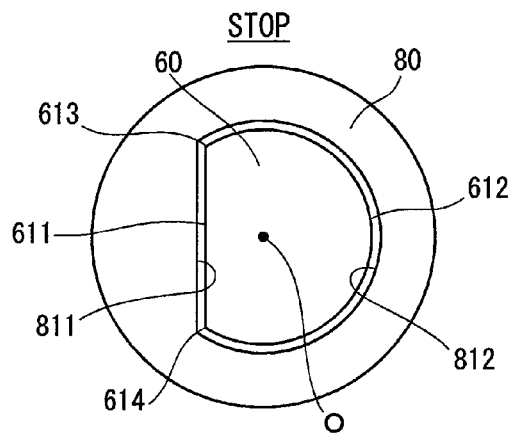
FIGS. 6A/B/C are illustrations of relationship between a shaft and the impeller at (A) a stop time, (B) a positioning time, and (C) a start-up time of a brushless motor.
Figure 6B:
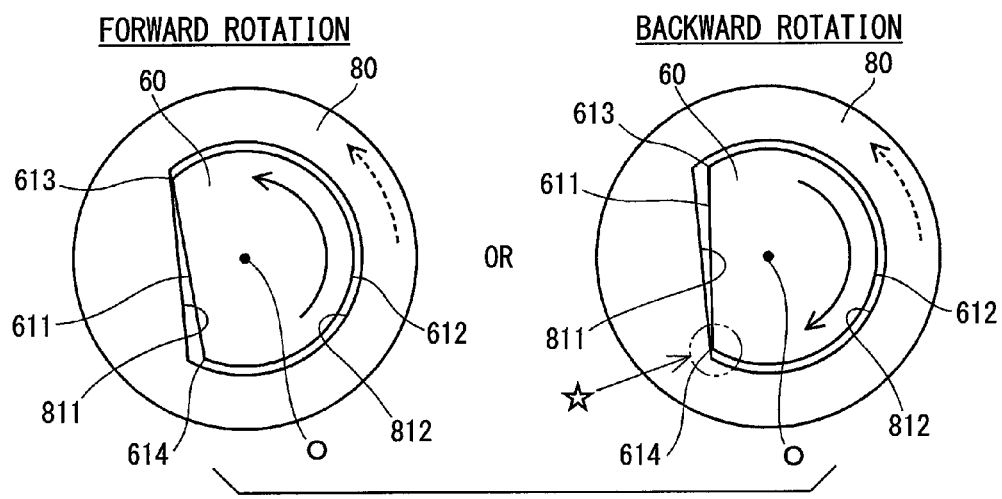
Figure 6C:
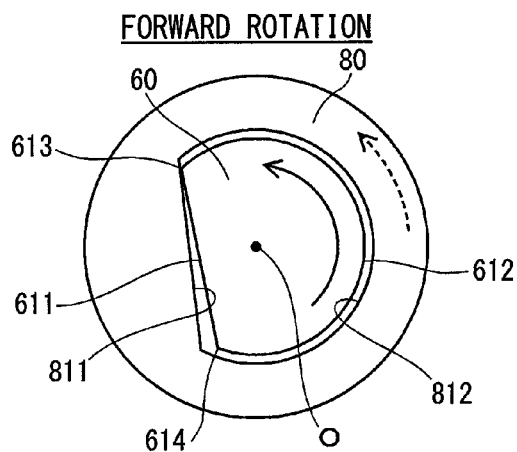

Here, in view of FIGS. 6A/B/C, the relationship between the shaft 60 and the impeller 80 at a stop time (FIG. 6A), a positioning time (FIG. 6B), and a start time (FIG. 6C) of the brushless motor 4 is respectively described. In the following, the relative rotating of the shaft 60 and the impeller 80 is caused about a rotation axis O. Further, in FIGS. 7-10 mentioned below, the stop time corresponds to a section I between time t0 and time t1, the positioning time corresponds to a section III and a section IV between time t2 and time t6. The start time corresponds to a section VI after time t7.

(FIG. 6A) At the stop time, the shaft 60 is in a neutral position in the hole 81 of the impeller 80.

(FIG. 6B) At the positioning time, the shaft 60 rotates forward or backward to the drive start position depending on the position of the rotor 50.

In case of the forward rotation, the one corner 613 of the shaft 60 collides with the inwall 811 of the hole 81 of the impeller 80, and, in case of the backward rotation, the other corner 614 of the shaft 60 collides with the inwall 811 of the hole 81 of the impeller 80 at a position of a star mark.

(FIG. 6C) At the start time, the one corner 613 of the shaft 60 rotates forward, which is in a contact state with the inwall 811 of the hole 81 of the impeller 80.

When the rotation of a brush-equipped motor is considered, which rotates in only one direction (i.e., only in a forward direction), the one corner 613 of the shaft 60 is always put in a contact state with the inwall 811 of the hole 81 of the impeller 80. In the brushless motor, every time the motor is started, the rotation direction of the motor may be different for the positioning in the first place. That is, every time the motor is started, either of the corner 613 or the corner 614 collides with the inwall 811 of the hole 81, thereby accelerating the wear or the breakage of the impeller 80.

The collision of the above components may simply be described in the following as a "collision of the shaft 60 with the impeller 80."

Now, the position detector 921, the position determiner 922, and the position setter 923 as well as the positioner 920 of the microcomputer 91 in the present embodiment are described. The following description should be understood as each of 920, 921, 922, 923 being provided as a function of the microcomputer 91.

The positioner 920 positions the rotor 50 at the drive start positions (i.e., positions P1-12) at which the drive control of the brushless motor 4 is startable, when the drive of the brushless motor 4 is started. The method of such positioning is disclosed in a Japanese patent, JP 2011-36083 A or the like, for example.

The positioner 920 has the position detector 921, the position determiner 922, and the position setter 923. The position detector 921 rotates a stopped rotor 50 by supplying the electric power thereto, and detects the position of the rotor 50 relative to the stator 30. More practically, the position detector 921 supplies the electric power to two of the three-phases (i.e., two of the U phase winding 41, the V phase winding 42, or the W phase winding 43), and rotates the rotor 50 compulsorily. Then, the induction voltage generated in the winding 40 of the non-power-supplied phase according to the rotation of the rotor 50 is detected, for the position detection of the rotor 50 relative to the stator 30. During such a position detection, the rotating direction of the rotor 50 is detectable by the position detector 921 based on the change of the detected induction voltage.

Figure 5B:
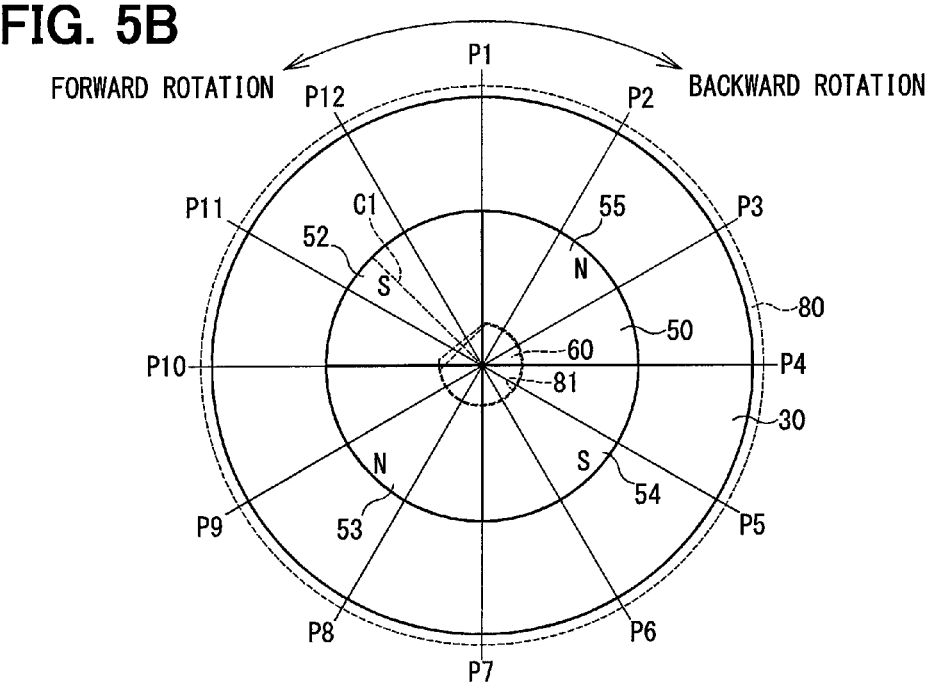
FIG. 5B is an illustration of the rotor positioning in which the rotor is positioned at a position other than the drive start position.

The position determiner 922 determines the "drive start position" based on the position and the rotating direction of the rotor 50 which are detected in the above. More specifically, as shown in FIG. 5B, when a center C1 (i.e., an S pole) of the magnet 52 of the rotor 50 is located between position P11 and position P12 and the rotor 50 is rotating backward, position P11 is determined as a "drive start position."

The position setter 923 switches the power supply to the winding 40, for rotating (i.e., for positioning) the rotor 50 to the drive start position determined by the position determiner 922. More practically, by supplying the power to three-phases, the center C1 of the magnet 52 is brought to position P11, which is determined by the position determiner as shown, for example, in FIG. 5B.

Thus, from the stop state of the rotor 50, the positioner 920 at least supplies the electric power twice to the winding 40, once for the position detection of the rotor 50, and once for the position determination, by the time the rotor 50 is positioned at the drive start position. That is, the power supply to the winding 40 is switched at least once during the positioning of the rotor 50.

The power supply control section 93 controls the power supply supplied to the brushless motor 4 (i.e., at least one of the electric current, the electric voltage, and the electric power), when the positioner 920 positions the rotor 50. Specifically, the power supply control section 93 of the present embodiment performs a "collision force moderation control," which eases a collision stress of a collision between the outwall 611 of the one end 61 of the shaft 60, and the inwall 811 of the hole 81 of the impeller 80 in the positioning control.

Further, the power supply control section 93 increases the power supply after the collision of the outwall of the shaft 60 with the inwall of the impeller 80, which is greater than the maximum value of the second output value I2. In such manner, the rotor 50 is quickly brought to the drive start position, while moderating the collision stress of the collision of the shaft 60 with the impeller 80. In the course of the collision, the microcomputer 91 can detect that the outwall of the shaft 60 has collided with the inwall of the impeller 80 by detecting a change of the induction voltage generated, for example, in the winding 40.

Further, the power supply control section 93 calculates the first output value I1 and the second output value I2 by a feedback control (e.g., by a PI control).

(Collision Force Moderation Control)

Figure 9:
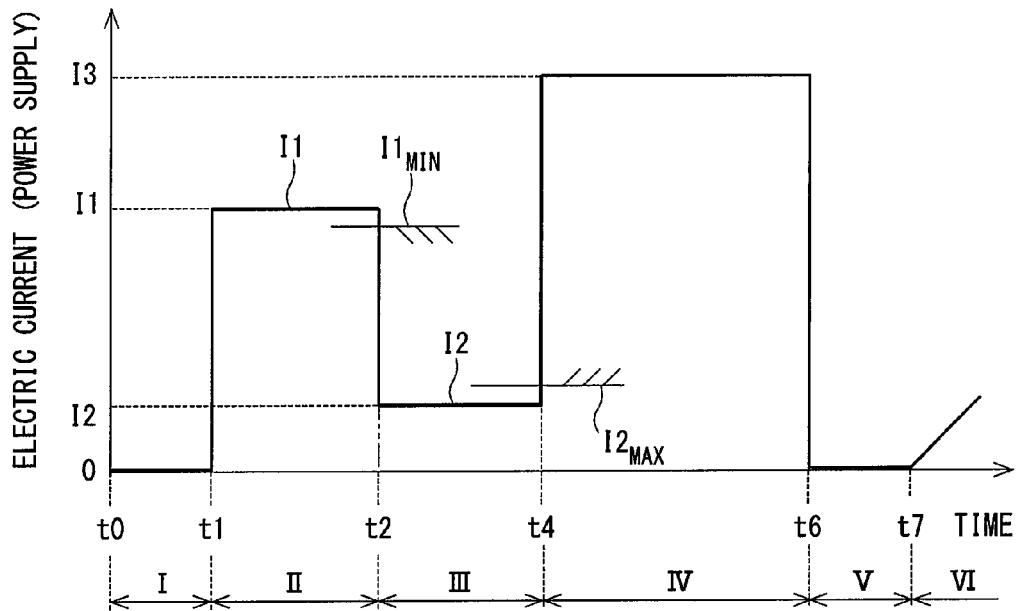
FIG. 9 is a time diagram of a collision force moderation control in a third embodiment of the present disclosure.
Figure 10:
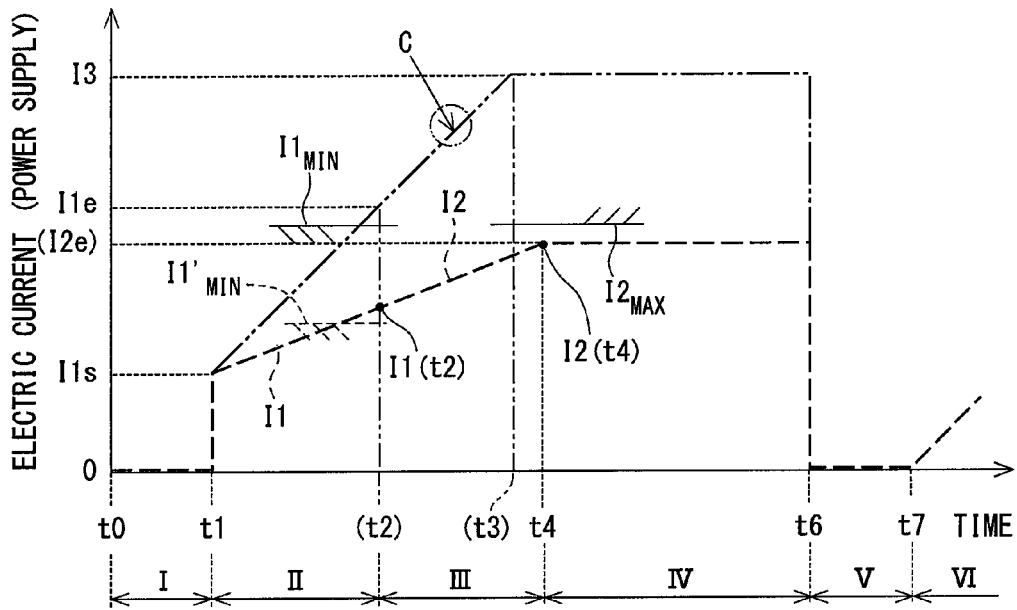
FIG. 10 is a time diagram of a positioning control in a comparative example.

Next, the collision force moderation control at the time of the rotor positioning by the drive controller in each of the embodiments of the present disclosure is described with reference to FIGS. 7-10 (FIG. 10 is a comparative example), in comparison to the simple positioning control of the comparative example.

First, the technical idea commonly used in each of the embodiments is described together with technical terms and numerals. FIGS. 7-10 are time diagrams regarding a change of the power supply according to the lapse of time, in which a vertical axis of the diagram shows an instructed electric current (i.e., a target electric current value) sent from the power supply control section 93 of the microcomputer 91 to the three-phase inverter 95. Here, based on an assumption that a feedback control is performed, the actual value is considered to be matched to the target value.

In the positioning control of each embodiment, an operation step which detects the position of the rotor 50 by the position detector 921 prior to a "collision" by the positioning is designated as a "pre-operation stage," and the value of the power supply in such a pre-operation stage is designated as a "first output value." For example, the first output value corresponds to the value of the power supply, when the power supply is performed to two phases for the detection of the induction voltage in a non-power-supply phase, and for the detection of the position of the rotor 50 based on the induction voltage.

After the position determiner 922 determines the drive start position and switches from the two-phase power supply to the three-phase power supply, an operation step in which the outwall of the shaft 60 collides with the inwall of the impeller 80 by the positioning process by the position setter 923 is designated as a "collision preparation stage." This implies that such an operation is performed as a preparation for the collision. Further, the value of the power supply of the three-phase power supply in the collision preparation stage is designated as the "second output value."

In each of the following embodiments, the power supply control section 93 of the microcomputer 91 controls the electric power supplied to the winding 40 from the three-phase inverter 95 by controlling the "electric current" as the power supply. In such control, the first output value is represented by "I1" and the second output value is represented by "I2." The power supply control section 93 may also control the electric voltage or the electric power as the power supply.

If the first output value I1 in the pre-operation stage is too small, the torque acceleration of the shaft 60 will not fully increase, and will not result in the number of rotation required for the detection of the induction voltage of the non-power-supply phase. In such case, the startability of the brushless motor 4 may fall, making it necessary for the maximum value of the first output value I1 to at least exceed the lower limit of the power supply that causes the number of rotations of the motor by which a barely-detect induction voltage is generated. The lower limit of the first output value I1 is named as "$I1_{MIN}$".

If the second output value I2 in the collision preparation stage is too large, the hole 81 of the impeller 80 may be worn out or damaged by the collision stress when the outwall of the shaft 60 collides with the impeller 80. Therefore, it is necessary for the second output value I2 to have a small value that is under a certain upper limit for avoiding the wear and breakage of the hole 81 by the collision. The upper limit of this second output value I2 is named as "$I2_{MAX}$."

The upper limit $I2_{MAX}$ is defined as a value that does not lead to the wear or breakage of the impeller 80 (i.e., the collision stress by the output torque of the brushless motor 4 according to such value will not wear or break the impeller 80.)

In the following, the time frames (i.e., times t0-t7 commonly shown on the horizontal axis of FIGS. 7-10) are described.

Time between t0-t1 (i.e., the section I) is a stop time of the rotor 50.

The two-phase power supply for a position detection is started at time t1, and the position of the rotor 50 is detected based on the induction voltage in the pre-operation stage (i.e., time between t1-t2, the section II). The value of the power supply at such time is the first output value I1.

At time t2, the two-phase power supply is switched to three-phase power supply, and the shaft 60 collides with the impeller 80 in the collision preparation stage (i.e., time between t2-t4, the section III). Here, time to the collision of the shaft 60 with the impeller 80 changes according to an initial position of the shaft 60 at time t2, the latest possible collision timing of the shaft 60 with the impeller 80 is set as time t4. The value of the power supply time between t2-t4 is the second output value I2.

The end time of the "collision preparation stage" is not strictly fixed to time t4, which may change according to an actual collision time when the drive control is started. However, time t4 is used as the end time of the collision preparation stage in common in all embodiments, for the brevity of the description, regardless of the actual collision timing.

During time between t4-t6 (i.e., the section IV), after the collision of the shaft 60 with the impeller 80, the rotor 50 rotates and is positioned to the drive start position. The allowable maximum value of the power supply in such stage is assumed as a third output value I3 that is greater than the second output value I2.

When the positioning of the rotor 50 is complete at time t6, an electric current value is set to 0 first at time between t6-t7 (i.e., the section V), and the drive of the brushless motor 4 will be started at time t7 (i.e., the drive control is started). After time t7 (i.e., the section VI), the brushless motor 4 rotates forward by the drive control.

The behavior of the motor 4 during time between t0-t1 and time between t6-t7 is common in FIGS. 7-10. Further, time t3 used only in FIG. 10 and time t5 used only in FIG. 7 will be described in association with those drawings.

The change of the electric current in the first comparative example is shown in FIG. 10 with a long dashed line, and the change of the electric current in the second comparative example is shown with a two-dot chain line. In the first and second comparative examples, no technical thought is provided regarding the switching of the power supply at time t2 (i.e., at a switching time from the two-phase power supply in the pre-operation stage to the three-phase power supply in the collision preparation stage). Therefore, the slope of the electric current at time t2 is constant, and the increase (i.e., the slope) of the first output value I1 in the pre-operation stage (i.e., time between t1-t2) extends into the collision preparation stage (i.e., time t2 and after) to define the second output value I2. That is, in the positioning control of the first comparative example and the second comparative example, the second output value I2 is set up to be greater than the first output value I1, according to the above.

In the second comparative example, the slope of the first output value of the electric current starting from a start value I1s in the pre-operation stage is set to a relatively large value, and the value of the electric current increases at a constant pace up to the third output value I3 at time t3 in the collision preparation stage. As a result, the electric current at time t4 exceeds the upper limit $I2_{MAX}$ of the second output value I2. Therefore, a crack of the impeller 80 may be caused at some timing C in the collision preparation stage (i.e., at a certain timing between t2-t4, in the section III).

In the first comparative example, on the other hand, the slope of the electric current for the first output value I1 and the second output value I2 throughout the pre-operation stage and the collision preparation stage (i.e., time between t1-t4) is set to a small angle, so that a value I2e which is an end value of the second output value I2 at time t4 becomes less than the upper limit value $I2_{MAX}$ of the second output value I2. Therefore, the collision stress at the time of the collision of the shaft 60 is restricted, and a wear and breakage of the impeller 80 is avoided.

Here, when the lower limit of the first output value I1 is relatively small, as shown with a broken line as $I1'_{MIN}$, the startability of the brushless motor 4 is secured even in the first comparative example.

However, when the lower limit of the first output value I1 is relatively large, as shown with a solid line as $I1_{MIN}$, the first output value I1 at the end of the collision preparation stage (i.e., at time t2) is smaller than $I1_{MIN}$, which may result in lower number of rotations that does not yield a detectable induction voltage.

Therefore, in the following embodiments of the present disclosure described below, even when the lower limit $I1_{MIN}$ of the first output value I1 is relatively large, the startability of the brushless motor 4 is improved without compromising the prevention of the wear and breakage of the impeller 80.

By the "collision force moderation control" of the present disclosure, a power supply is distinguished for a stage before t2 and for a stage after t2, at which the two-phase power supply in the pre-operation stage is switched to the three-phase power supply in the collision preparation stage, and the second output value I2 of the collision preparation stage (i.e., at time t2 and after) is switched from the first output value I1 of the pre-operation stage (i.e., before time t2).

In the following embodiments, specifically, the maximum value of the first output value I1 is set up to exceed the lower limit $I1_{MIN}$, and the second output value I2 is set up to be less than the upper limit $I2_{MAX}$.

The lower limit $I1_{MIN}$ and the upper limit $I2_{MAX}$ correspond to the "first predetermined threshold value" and the "second predetermined threshold value," respectively.

When the pre-operation stage transits to the collision preparation stage, the value of the power supply falls to the second output value I2 from the first output value I1.

First Embodiment

Figure 7:
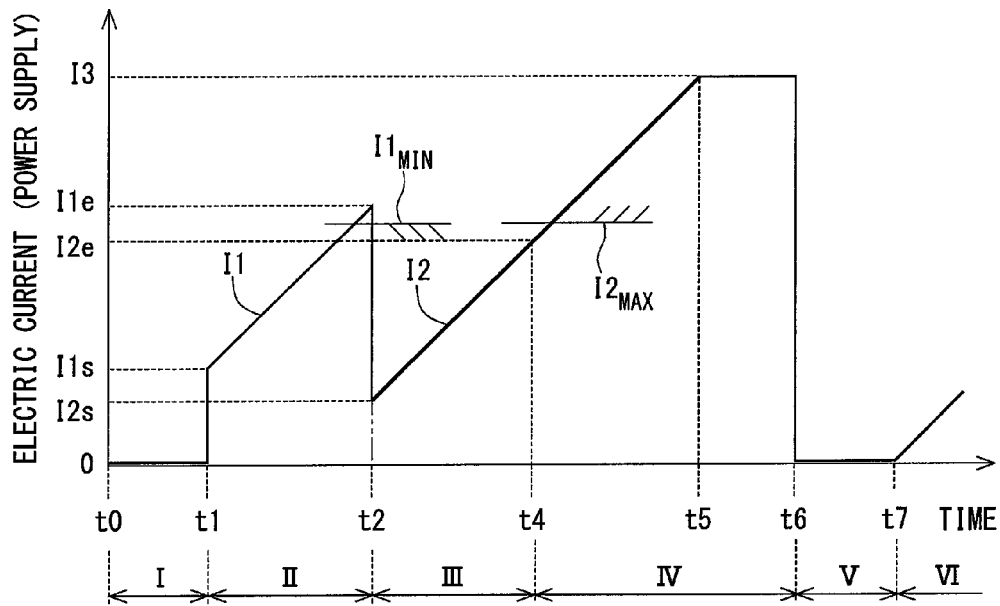
FIG. 7 is a time diagram of a collision force moderation control in a first embodiment of the present disclosure.

In the first embodiment shown in FIG. 7, the first output value I1 of the pre-operation stage (at the position detection time) increases with a fixed slope from the start value I1s of time t1 to an end value I1e of time t2.

When the power supply is switched at time t2, and the operation transits to the collision preparation stage (i.e., to a positioning process), a start value I1s of the second output value I2 is set to a value which is lower than the end value I1e of the first output value. The second output value I2 of the collision preparation stage (i.e., of the positioning process) increases with a fixed slope from the start value I2s of time t2 to the end value I2e of time t4. The electric current increases with the same slope after the collision at time t4, and the electric current stays at a constant value, at the third output value I3, after reaching there at time t5, until time t6.

As described above, the electric current changes in a saw-like shape in the first embodiment. Further, the end value I1e of the first output value is set to be equal to or greater than the lower limit $I1_{MIN}$, and the end value I2e of the second output value is set to be less than the upper limit $I2_{MAX}$.

The operational effects of the first embodiment are described below.

As an example, the drive controller 90 of the present embodiment controls the drive of the motor 4, which has the stator 30 and the rotor 50 that is rotatably disposed relative to the stator 30. The motor 4 also has the shaft 60 connected to the rotor 50, the shaft 60 being engaged with the hole 81 bored on the impeller 80 (i.e., the load) in a gapped and stoppably rotatable manner. Further, the output torque of the motor 4 is transmittable to the impeller 80. The drive controller 90 also includes the power supply control section 93 that controls the power supply, including at least one of the electric current, the electric voltage, or the electric power to the motor.

When the collision of the shaft 60 with the impeller 80 is predicted during the drive start time or during the drive time of the motor 4, the power supply control section 93 performs, prior to such collision, the "collision force moderation control" for moderating the collision force in the collision of the shaft 60 with the impeller 80. The collision force moderation control is realized by the switching of the power supply of the first output value I1 in the "pre-operation stage" to the power supply of the second output value I2 in the "collision preparation stage." The "pre-operation stage" may more practically be the operation of the shaft 60 in preparation for the collision, and the "collision preparation state" may more practically be the operation of the shaft 60 from the switching of the power supply switched from the pre-operation stage to the collision preparation stage to the collision of the shaft 60 with the impeller 80.

Thus, by distinguishably controlling the power supply in the pre-operation stage and in the collision preparation stage, the motor startability such as a reduction of the start-up time is prioritized and improved in the pre-operation stage, for example. Also, in the collision preparation stage, the moderation of the collision force is prioritized. Therefore, the wear and breakage of the impeller 80 by the collision with the shaft 60 is suitably prevented, while securing the drive characteristic of the motor.

Also, in the collision force moderation control of the present embodiment, the maximum value of the first output value I1 is, as the "first predetermined threshold value," set up to exceed the lower limit $I1_{MIN}$ for yielding the number of rotations to create detectable induction voltage, and the second output value I2 is, as the "second predetermined threshold value," set up to be less than the upper limit $I2_{MAX}$ for avoiding the wear and breakage of the hole 81 by the collision.

Thereby, in the pre-operation stage, the position of the rotor 50 is securely detectable, and the wear and breakage of the hole 81 is suitably prevented in the collision preparation stage.

Further, in case that the upper limit $I2_{MAX}$ of the second output value I2 is equal to or less than the lower limit $I1_{MIN}$ of the first output value I1, at the transition time from the pre-operation stage to the collision preparation stage, the value of the power supply falls from the first output value I1 to the second output value I2.

Also, in the present embodiment, the collision force moderation control is effectively performed at the motor start time of starting the motor 4. Therefore, the effect of the above-mentioned "control of the wear and breakage" becomes effective in controlling the drive of the motor 4 by frequently turning it ON and OFF (i.e., is turned ON and OFF in a greater number of times) in a preset period of time.

Further, the motor driven in the present embodiment may be a three-phase brushless motor, and the power supply phase may be switched in the pre-operation stage and in the collision preparation stage.

Also, the three-phase brushless motor is a position sensor-less type motor, and the drive controller 90 has the positioner 920 which brings the rotor 50 to the drive start position, during which the drive control of the brushless motor 4 is startable at the time of starting the drive of the brushless motor 4.

Further, the positioner 920 includes the position detector 921, the position determiner 922, and the position setter 923.

The position detector 921 detects, in the pre-operation stage, the position of the rotor 50 based on the induction voltage generated in a non-power-supply phase.

Also, the position determiner 922 determines the drive start position based on the position of the rotor 50 which is detected by the position detector 921.

Further, the position setter 923 switches the power supply in the collision preparation stage, and the rotor 50 is positioned by rotating the rotor 50 to the drive start position which is determined by the position determiner 922.

Thus, the positioner 920 of the present embodiment detects the position of the rotor 50, determines the "drive start position" based on the detected position of the rotor 50, and positions the rotor 50 at the determined "drive start position." Therefore, the time required by the start of the drive control for starting the drive of the brushless motor 4 is reduced.

Further, in the present embodiment, the power supply control section 93 increases the power supply after the collision to be greater than the maximum value of the second output value. Therefore, while restricting the collision force of the shaft 60 in the collision with the impeller 80, the rotor 50 is quickly positioned at the "drive start position" by such operation. Therefore, the time required by the start of the drive control of the brushless motor 4 is further reduced.

Also, in the present embodiment, the first output value I1 and the second output value I2 are calculated by the feedback control. Thereby, the actual value is controlled with sufficient accuracy to the target value.

Further, the motor drive system 100 of the present embodiment is provided with the motor 4, the impeller 80, which has the hole 81, and the above-mentioned drive controller 90, which controls the drive of the motor 4.

The motor 4 is provided with the stator 30, and the rotor 50 is rotatably disposed relative to the stator 30. Also, the shaft 60 is connected with the rotor 50 to engage with the hole 81 on the impeller 80 in a gapped manner, thereby making the output torque transmittable to the impeller 80 (i.e., to the load).

The motor drive system 100 of the present embodiment uses the drive controller 90 to perform the collision force moderation control, when the collision of the shaft 60 with the hole 81 of the impeller 80 is predicted at the motor start time or during the motor drive time. In such manner, the wear and breakage of the impeller 80 by the collision between the shaft 60 and the hole 81 is prevented.

Also, according to the present embodiment, the driving outwalls 611 and 612 formed on the one end 61 of the shaft 60 (i.e., the "rotatable engager") engage with the driven inwalls 811 and 812 formed on the hole 81 (i.e., the "force receiver").

Further, the driving outwalls 611 and 612 and the driven inwalls 811 and 812 engage with each other by taking a partially-flat shape (i.e., via a flat part of the circumferential wall) on each of the inwalls and the outwalls.

Further, the fuel pump 1, which transfers fuel by the rotation of the impeller 80 is combined with the motor 4 in one body.

Thus, the motor drive system of the present disclosure is suitably used as the fuel pump 1 which transfers fuel, for example, by the rotation of the impeller 80.

Also, according to the present embodiment, the motor drive system 100 is installed in a vehicle.

Since the motor drive system in the vehicle is typically turned ON and OFF very frequently for the operation of the fuel pump, the blower fan and the like as the load, the motor drive system of the present disclosure having the above-described features used in such environment is expected to exert quite a few advantages including the longer product life and the like.

Regarding the second and third embodiments described in the following, the differences of those embodiments from the first embodiment are mainly described.

Second Embodiment

Figure 8:
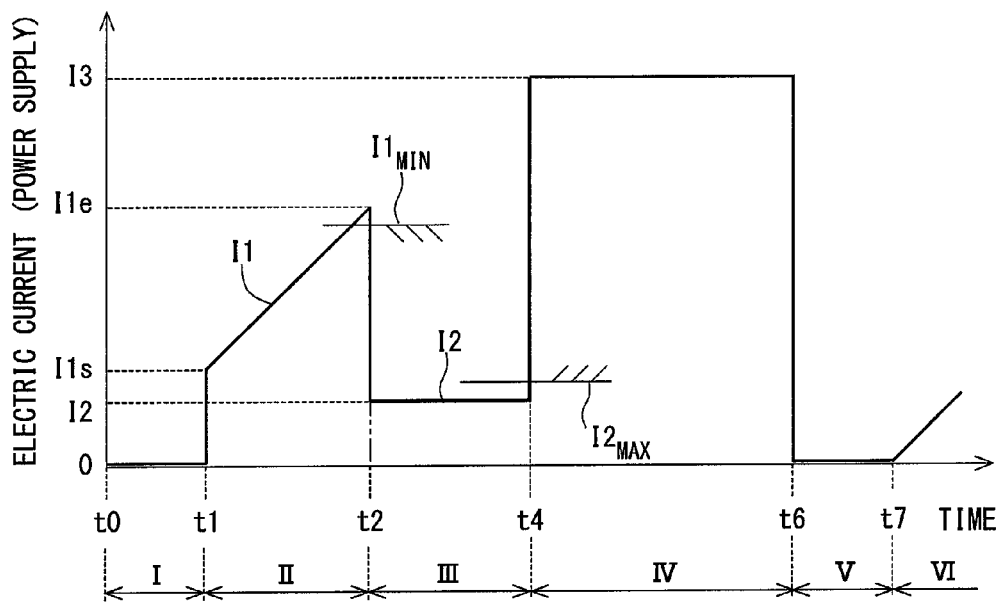
FIG. 8 is a time diagram of a collision force moderation control in a second embodiment of the present disclosure.

In the second embodiment shown in FIG. 8, the second output value I2 in the collision preparation stage (i.e., time between t2-t4) is set up as a constant value, which is increasing in the first embodiment, and the second output value I2 increases in a step form to the third output value I3 at time t4.

Since the time of the collision of the shaft 60 with the impeller 80 changes depending on the initial position of the shaft 60 as described above, the electric current control scheme in the first embodiment, in which the second output value I2 is gradually increased from time t2, may have the fluctuation of the electric current at the time of the collision.

Therefore, by setting the second output value I2 in the collision preparation stage to have the constant value, the following effect is exerted in addition to the effects of the first embodiment.

That is, according to the second embodiment, the second output value I2 is set up as a constant value. Thereby, the energy of the collision is equated regardless of the initial position of the shaft 60, thus yielding a stable product quality. Further, by setting the upper limit $I1_{MIN}$ to have a lower value, the safety margin for the wear and breakage is increased.

Third Embodiment

According to the third embodiment shown in FIG. 9, the second output value I2 in the collision preparation stage (i.e., time between t2-t4) is set up as a constant value, just like the second embodiment. Further, the electric current increases in a step form from 0 to the first output value I1 at time t1, and the first output value I1 in the pre-operation stage (i.e., time between t1-t2) is set up as a constant value in the third embodiment.

In addition to the operation effects of the first and second embodiments, the third embodiment reduces the start-up time for the start of the motor drive, by quickly increasing the number of rotations in the pre-operation stage (i.e., at the position detection time), which reduces time to reach the induction voltage detectable rotation number.

Other Embodiments (a) The drive controller of the present disclosure may not only be used for the drive control of the three-phase brushless motor, but also used for the drive control of the multiphase brushless motor having four phases or more.

Further, the drive controller may be used not only for the positioning control of the brushless motor of a position sensor-less type, but also used for the control of the brushless motor having a position sensor, or used for the control of the brush-equipped motor. In such case, the operation in the "pre-operation stage" may be any operation other than the position detection operation.

(b) When the drive controller performs the positioning control, in other embodiments of the present disclosure, the positioner 920 may position the rotor 50, without performing a position detection (i.e., the preparation operation) by the position detector 921, or without determining a "drive start position" by the position determiner 922.

For example, as disclosed in JP 4-312390 A, the rotor 50 can be positioned by performing a first positioning, in which the power is supplied to one phase for a preset period of time, and by performing a second positioning, in which the power is supplied to the remaining phase(s) for a preset period of time.

(c) According to other embodiments of the present disclosure, the power supply control section 93 may keep the power supply after the collision of the outwall of the shaft 60 with the inwall of the hole 81 of the impeller 80 at a value that is equal to or smaller than the second output value I2, instead of increasing from the second output value I2.

(d) According to other embodiments of the present disclosure, the power supply control section 93 may calculate the first output value I1 and the second output value I2 without relying on the feedback control.

(e) The structure of the "rotatable engager of the motor and the force receiver of the load" in the motor drive system of the present disclosure may take other forms, other than the one in the above-described embodiments. That is, the above-described structure, in which the end 61 of the shaft 60 (i.e., the rotatable engager) engages with the inside of the hole 81 (i.e., the force receiver), may be modified to a so-called "outer-rotor structure," in which the cylinder part of the rotatable engager engages with an outside of the shaft that is driven as the force receiver. For example, the inner wall of the rotatable cylinder on the driving side may have a claw (i.e., a ratchet), and the outer wall of the shaft having a gear may be engaged with the claw, for transmitting the output torque of the motor.

(f) In the above-described configuration in which the end part of the shaft engages with the inside of the hole, the shape of the engaging part may be other than the D shape. That is, the engaging part may take an I shape, or may take a polygonal shape, for example, as long as the shape of the engaging part satisfies the condition of "having a partially-flat shape". Further, the shaft and the impeller may be connected by a spline coupling.

(g) The motor drive system of the present disclosure may be usable, when installed in a vehicle, for driving the motor of a blower fan in the air-conditioner or the like, other than the fuel pump. The force receiver of the blower fan is typically made with resin, which is a suitable object of the drive control by the drive controller of the present disclosure, in terms of prevention of the wear and breakage of the force receiver. Further, the motor drive system of the present disclosure may be used for the drive control of the motor in any device other than the motor in the vehicle.

Although the present disclosure has been described in connection with preferred embodiments thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A drive controller for controlling a drive of a motor that outputs a torque to a load, the drive controller comprising:

a microcomputer configured to include a power supply control section that controls a power supply including at least one of an electric current, an electric voltage, or an electric power to the motor having a stator and a rotor that is rotatably disposed relative to the stator and has a rotatable engager being engaged with a force receiver of the drive load, the engagement of the rotatable engager and the force receiver established with a gap interposed between the rotatable engager and the force receiver and allowing rotation of the rotatable engager relative to the force receiver, wherein when a collision of the rotatable engager with the force receiver is predicted during a motor start time or during a motor drive time, the power supply control section performs a collision force moderation control in a pre-operation stage and in a collision preparation stage, the pre-operation stage of the collision force moderation control controls a pre-operation of the rotatable engager prior to the collision, the collision preparation stage of the collision force moderation control controls an operation of the rotatable engager from a switching of the power supply by the power supply control section subsequent to the pre-operation stage until the collision, and the collision force moderation control changes a first output value of the power supply in the pre-operation stage to a second output value of the power supply in the collision preparation stage, for a moderation of a collision force generated in the predicted collision of the rotatable engager with the force receiver.

2. The drive controller of claim 1, wherein a maximum value of the first output value is set to be greater than a first threshold, and is set to be smaller than a second threshold.

3. The drive controller of claim 2, wherein the first output value of the power supply falls to the second output value, during a transition from the pre-operation stage to the collision preparation stage.

4. The drive controller of claim 2, wherein the second output value is a constant value.

5. The drive controller of claim 1, wherein the collision force moderation control is performed during the motor start time.

6. The drive controller of claim 1, wherein the motor is a multi-phase motor having at least three phases, and a phase switching is caused according to a transition from the pre-operation stage to the collision preparation stage.

7. The drive controller of claim 6, the motor of which being a multi-phase brushless motor of a position sensor-less type, the drive controller further comprising:

a positioner positioning, during the motor start time, a rotation position of the brushless motor to a drive start position so as to start a drive control of the brushless motor, wherein the positioner includes:

a position detector detecting a position of the rotor in the pre-operation stage based on an induction voltage in a non-power supply phase, the non-power supply phase receiving no power supply;

a position determiner determining the drive start position based on a detected position of the rotor by the position detector; and a position setter switching the power supply phase of the motor and rotating the rotor to the drive start position determined by the position determiner.

8. The drive controller of claim 1, wherein
the power supply control section increases the power supply after the collision to a value that is greater than a maximum value of the second output value.

9. The drive controller of claim 1, wherein
the power supply control section calculates the first output value and the second output value based on a feedback control.

10. A motor drive system comprising:
a motor having a stator and a rotor that is rotatably disposed relative to the stator, the rotor having a rotatable engager being engaged with a force receiver of a load, the engagement of the rotatable engager and the force receiver established by a rotatable gap interposed between the rotatable engager and the force receiver to transmit a torque output from the motor;
the load including the force receiver; and
a drive controller for controlling a drive of a motor that outputs a torque to a load, the drive controller configured to include a power supply control section that controls a power supply including at least one of an electric current, an electric voltage, or an electric power to the motor having a stator and a rotor that is rotatably disposed relative to the stator and has a rotatable engager being engaged with a force receiver of the drive load, the engagement of the rotatable engager and the force receiver established with a gap interposed between the rotatable engager and the force receiver to allow rotation of the rotatable engager relative to the force receiver, wherein
when a collision of the rotatable engager with the force receiver is predicted during a motor start time or during a motor drive time, the power supply control section performs a collision force moderation control in a pre-operation stage and in a collision preparation stage,
the pre-operation stage of the collision force moderation control controls a pre-operation of the rotatable engager prior to the collision,
the collision preparation stage of the collision force moderation control controls an operation of the rotatable engager from a switching of the power supply by the power supply control section subsequent to the pre-operation stage until the collision, and
the collision force moderation control changes a first output value of the power supply in the pre-operation stage to a second output value of the power supply in the collision preparation stage, for a moderation of a collision force generated in the predicted collision of the rotatable engager with the force receiver.

11. The motor drive system of claim 10, wherein
the rotatable engager provided as an end part of a shaft has a driving outwall formed on the end part,
the force receiver provided as a hole has a driven inwall formed on the force receiver, and
the driving outwall engages with the driven inwall.

12. The motor drive system of claim 11, wherein
the driving outwall on the end part of the shaft and the driven inwall of the hole respectively have a partially-flat shape as an engaging part, and
the engagement between the engaging part of the driving outwall and the engagement part of the driven inwall is established by a flat part of a circumferential wall of the driving outwall and a flat part of a circumferential wall of the driven inwall.

13. The motor drive system of claim 10, wherein
the motor and a liquid pump for press-feeding of a liquid by a rotation of the load are formed in one body.

14. The motor drive system of claim 10, wherein
the motor drive system is installed in a vehicle.

\* \* \* \* \*